United States Patent
Ramsay

(10) Patent No.: US 9,134,154 B2
(45) Date of Patent: *Sep. 15, 2015

(54) PERCENTAGE DEVIATION BASED EVALUATION OF VELOCITY DEPENDENT CHARACTERISTICS IN ULTRASONIC FLOW METERING SYSTEMS

(71) Applicant: DANIEL MEASUREMENT AND CONTROL, INC., Houston, TX (US)

(72) Inventor: Lawson Hamilton Ramsay, Falkirk (GB)

(73) Assignee: DANIEL MEASUREMENT AND CONTROL, INC., Houston, TX (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/928,541

(22) Filed: Jun. 27, 2013

(65) Prior Publication Data

US 2014/0109689 A1    Apr. 24, 2014

Related U.S. Application Data

(60) Provisional application No. 61/716,157, filed on Oct. 19, 2012.

(51) Int. Cl.
*G01F 1/66* (2006.01)
*G01F 25/00* (2006.01)

(52) U.S. Cl.
CPC ........ *G01F 1/66* (2013.01); *G01F 1/662* (2013.01); *G01F 25/0007* (2013.01)

(58) Field of Classification Search
CPC ....... G01M 3/2815; G01F 1/667; G01F 1/662
USPC .............. 73/861.18, 861.27, 861.28; 702/48; 340/606
See application file for complete search history.

(56) References Cited

U.S. PATENT DOCUMENTS

| | | | |
|---|---|---|---|
| 2014/0109645 A1* | 4/2014 | Ramsay | 73/1.34 |
| 2014/0109686 A1* | 4/2014 | Ramsay | 73/861.18 |
| 2014/0109690 A1* | 4/2014 | Ramsay et al. | 73/861.28 |
| 2015/0000420 A1* | 1/2015 | Ramsay | 73/861.01 |

* cited by examiner

*Primary Examiner* — Jewel V Thompson
(74) *Attorney, Agent, or Firm* — Conley Rose, P.C.

(57) ABSTRACT

Apparatus and method for monitoring operation of an ultrasonic flow meter. In one embodiment, an ultrasonic flow metering system includes a passage for fluid flow, an ultrasonic flow meter, and a condition monitor. The ultrasonic flow meter is configured to measure transit time of an ultrasonic signal through the fluid flowing in the passage. The condition monitor is coupled to the ultrasonic flow meter and is configured to monitor a parameter of operation of the ultrasonic meter, and to acquire a plurality of values of the parameter over time. The condition monitor is also configured to compute, for each of the acquired values, a difference between the acquired value and a predetermined reference, and to arrange the differences in time sequence.

20 Claims, 6 Drawing Sheets

" In addition, the term "couple" or
PERCENTAGE DEVIATION BASED EVALUATION OF VELOCITY DEPENDENT CHARACTERISTICS IN ULTRASONIC FLOW METERING SYSTEMS

CROSS REFERENCE TO RELATED APPLICATION

The present application claims priority to U.S. Provisional Patent Application No. 61/716,157, filed on Oct. 19, 2012; which is hereby incorporated herein by reference in its entirety.

BACKGROUND

Natural gas is transported from place-to-place via pipelines. It is desirable to know with accuracy the amount of gas flowing in the pipeline, and particular accuracy is demanded when the fluid is changing hands, or "custody transfer." Even where custody transfer is not taking place, however, measurement accuracy is desirable, and in these situations, flow meters may be used.

Ultrasonic flow meters are one type of flow meter that may be used to measure the amount of fluid flowing in a pipeline. Ultrasonic flow meters have sufficient accuracy to be used in custody transfer. In an ultrasonic flow meter, acoustic signals are sent back and forth across the fluid stream to be measured. Based on parameters of received acoustic signals, the fluid flow velocity in the flow meter is determined. The volume of fluid flowing through the meter can be determined from determined flow velocities and the known cross-sectional area of the flow meter.

An ultrasonic flow metering system is subject to various conditions that affect the calibration, accuracy, and/or operation of the metering system. For example, accumulation of contaminants in the pipeline, flow restrictions, and/or differences or changes in operating environment with respect to calibration environment may affect flow meter accuracy. Accordingly, effective techniques for monitoring conditions related to flow meter operation and accuracy are desirable.

SUMMARY

Apparatus and methods for monitoring operation of an ultrasonic flow meter are disclosed herein. In one embodiment, an ultrasonic flow metering system includes a passage for fluid flow, an ultrasonic flow meter, and a condition monitor. The ultrasonic flow meter is configured to measure transit time of an ultrasonic signal through the fluid flowing in the passage. The condition monitor is coupled to the ultrasonic flow meter and is configured to monitor a parameter of operation of the ultrasonic meter, and to acquire a plurality of values of the parameter over time. The condition monitor is also configured to compute, for each of the acquired values, a difference between the acquired value and a predetermined reference, and to arrange the differences in time sequence.

In another embodiment, a method for monitoring operation of an ultrasonic flow meter includes acquiring, by a monitoring system, a plurality of values of a parameter of operation of the flow meter during operation of the flow meter. For each of the acquired values, a difference between the acquired value and a predetermined reference is computed, by the monitoring system, and the differences are arranged in time sequence.

In a further embodiment, a condition monitoring system for monitoring operation of an ultrasonic flow meter includes a parameter verification engine. The parameter verification engine is configured to acquire a plurality of values of a parameter of operation of the flow meter during operation of the flow meter. The parameter verification engine is also configured to compute, for each of the acquired values, a difference between each of the acquired values and a predetermined reference, and to arrange the differences in time sequence.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
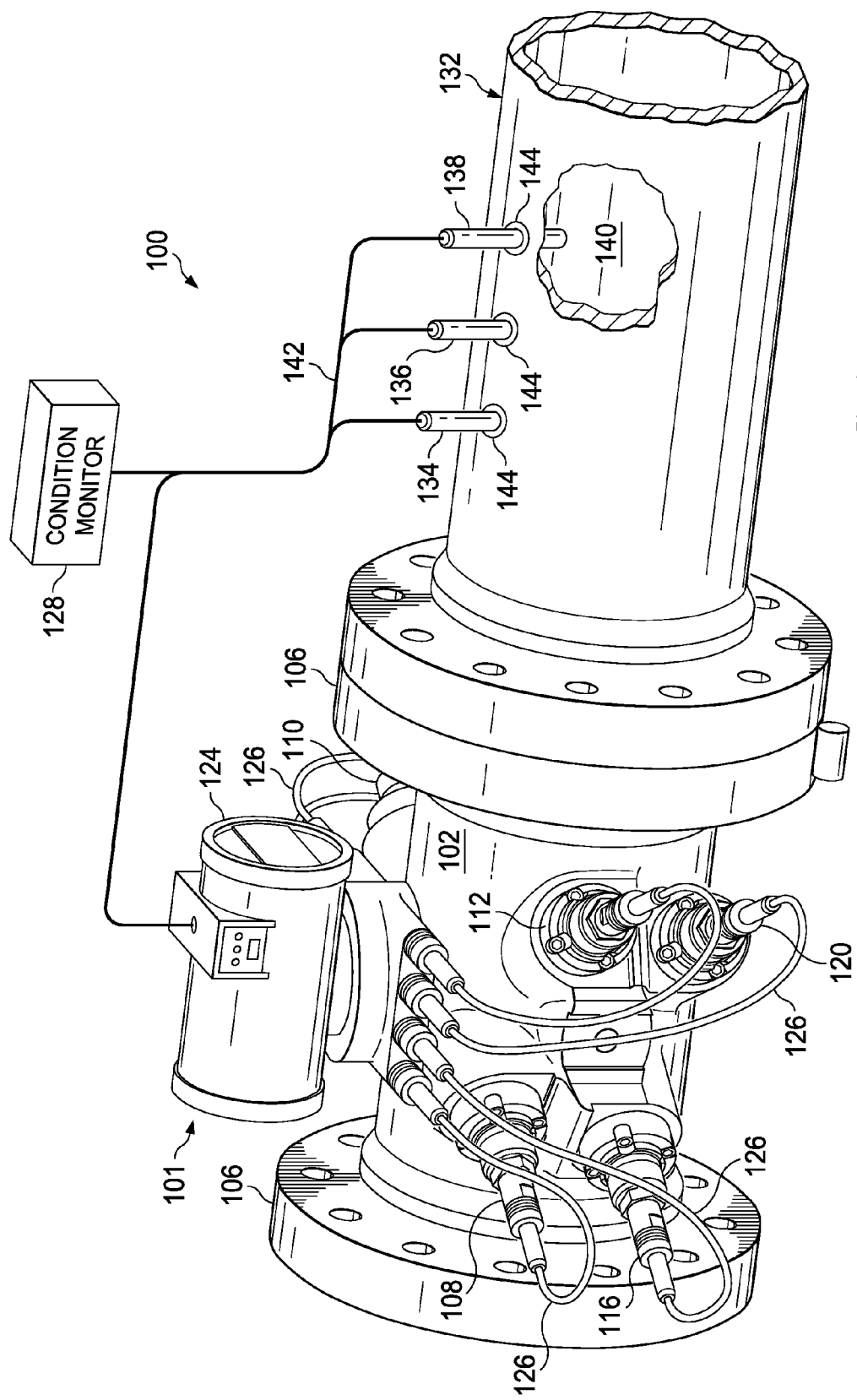
FIG. 1 shows an ultrasonic flow metering system in accordance with various embodiments.

In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct electrical connection. Thus, if a first device couples to a second device, that connection may be through a direct electrical connection, or through an indirect electrical connection accomplished via other devices and connections. Further, the term "software" includes any executable code capable of running on a processor, regardless of the media used to store the software. Thus, code stored in memory (e.g., non-volatile memory), and sometimes referred to as "embedded firmware," " is included within the definition of software. The recitation "based on" is intended to mean "based at least in part on." Therefore, if X is based on Y, X may be based on Y and any number of other factors. The term "fluid" includes liquids and gases.

DETAILED DESCRIPTION

The following description is directed to various exemplary embodiments of the invention. The drawing figures are not necessarily to scale. Certain features of the embodiments may be shown exaggerated in scale or in somewhat schematic form and some details of conventional elements may not be shown in the interest of clarity and conciseness. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil, natural gas), and the description follows from the developmental context; however, the systems and methods described are equally applicable to measurement of any fluid flow.

Ultrasonic flow metering systems include condition monitors (e.g., condition-based monitoring systems) to enable detection of changes in metering system operation and/or system operating conditions, and correction of conditions causing the changes. An ultrasonic meter condition monitor is a system that monitors the operation of the ultrasonic meter and associated instrumentation. A condition monitor may analyze the operation of the metering system by performing exemplary functions such as:

detection of changes in flow characteristics such as flow profile, flow symmetry, flow swirl, flow turbulence, etc.
  detection of changes in results of ultrasonic diagnostics such as error rate in the detection of ultrasonic signals, gain levels, noise levels, peakswitch detection, etc.
  comparison of measured speed of sound from the ultrasonic flow meter to gas composition, pressure and temperature using the AGA10 standard;
  comparison of measured temperature against temperature derived from the speed of sound; and
  comparison of density derived from a gas composition sensor (e.g., a gas chromatograph) versus density derived from speed of sound.

Conventional ultrasonic condition monitors generate a flow characteristic curve of velocity versus profile factor, crossflow, symmetry, gain or other velocity dependant characteristics. Unfortunately, when meter performance changes, it is unclear, based on such information, whether the change is random (i.e., occurring randomly throughout a sample period), or occurs at a specific time (i.e., the meter performance changed at a specific time).

Embodiments of the present disclosure compute the difference over time of one or more selected ultrasonic meter operating parameter with respect to a reference or expected value. Based on the difference over time, embodiments can identify operational trends and discrepancies that are obscured in the data generated by conventional condition monitors. Thus, embodiments allow for efficient identification of conditions that may affect accuracy or operation of an ultrasonic flow metering system.

FIG. 1 shows an ultrasonic flow metering system 100 in accordance with various embodiments. The system 100 includes an ultrasonic flow meter 101, sensors 134, 136 138, and a condition monitor 128. In the system 100, the ultrasonic flow meter 101 is coupled to a pipe or other structure 132. In some embodiments, the pipe 132 is disposed downstream of the ultrasonic flow meter 101. The pipe 132 includes openings 144 that allow sensors 134-138 to access the fluid stream flowing through the system 100. The condition monitor 128 is coupled to the sensors 134-138 and to the ultrasonic meter 101. In some embodiments, the condition monitor 128 may be part of a flow computer coupled to the ultrasonic meter 101. In other embodiments, the condition monitor 128 may be integrated with electronics 124 of the ultrasonic meter 101, or implemented as a discrete device.

The ultrasonic flow meter 101 includes a meter body or spool piece 102 that defines a central passage or bore. The spool piece 102 is designed and constructed to be coupled to a pipeline or other structure carrying fluids (e.g., natural gas) such that the fluids flowing in the pipeline travel through the central bore. While the fluids travel through the central bore, the ultrasonic flow meter 101 measures the flow rate (hence, the fluid may be referred to as the measured fluid). The spool piece 102 includes flanges 106 that facilitate coupling of the spool piece 102 to another structure. In other embodiments, any suitable system for coupling the spool piece 102 to a structure may be equivalently used (e.g., weld connections).

In order to measure fluid flow within the spool piece 102, the ultrasonic flow meter 101 includes a plurality of transducer assemblies. In the view of FIG. 1, five such transducers assemblies 108, 110, 112, 116 and 120 are in full or partial view. The transducer assemblies are paired (e.g., transducer assemblies 108 and 110), as will be further discussed below. Moreover, each transducer assembly electrically couples to control electronics package 124. More particularly, each transducer assembly is electrically coupled to the control electronics package 124 by way of a respective cable 126 or equivalent signal conducting assembly.

Figure 2:
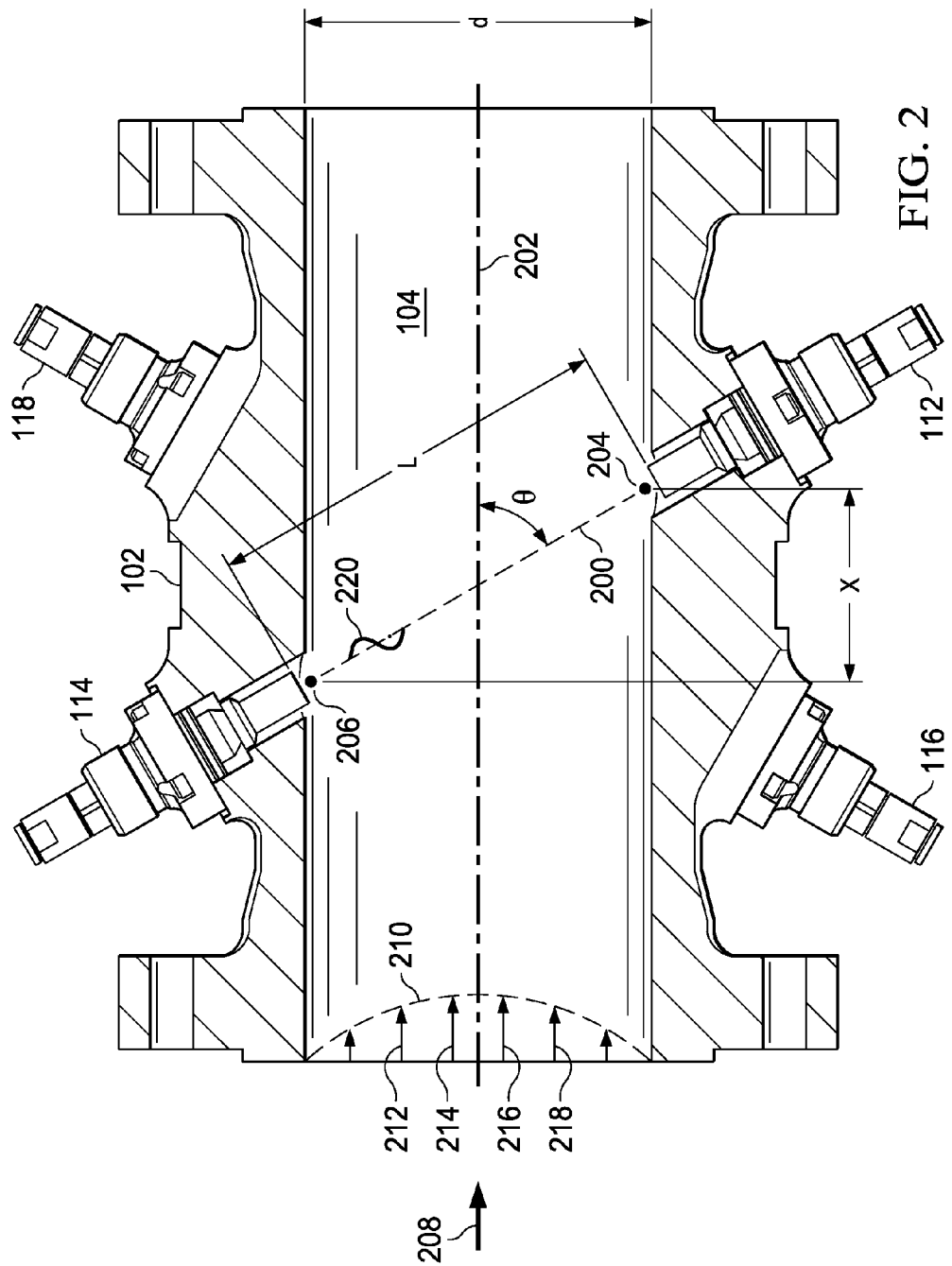
FIG. 2 shows a cross-sectional overhead view of an ultrasonic flow meter in accordance with various embodiments.

FIG. 2 shows a cross-sectional overhead view of the ultrasonic flow meter 101. Spool piece 102 has a predetermined size and defines the central bore 104 through which the measured fluid flows. An illustrative pair of transducers assemblies 112 and 114 is located along the length of spool piece 102. Transducers 112 and 114 are acoustic transceivers, and more particularly ultrasonic transceivers. The ultrasonic transducers 112, 114 both generate and receive acoustic signals having frequencies above about 20 kilohertz. The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics 124 associated with the flow meter 101

A path 200, also referred to as a "chord," exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore). The position of transducer assemblies 112 and 114 may be defined by the angle θ, by a first length L measured between the faces of the transducer assemblies 112 and 114, a second length X corresponding to the axial distance between points 204 and 206, and a third length d corresponding to the pipe inside diameter. In most cases, distances d, X, and L are precisely determined during flow meter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Sometime later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 101 carrying the fluid, the average velocity over the area of the central bore 104 may be used to find the volume of fluid flowing through the spool piece 102.

Ultrasonic flow meters can have one or more chords. For example, the flow meter 101 includes four chordal paths at varying elevations within the spool piece 102. The flow velocity of the fluid may be determined at each chord to obtain chordal flow velocities, and the chordal flow velocities combined to determine an average flow velocity over the entire pipe. From the average flow velocity, the amount of fluid flowing in the spool piece, and thus the pipeline, may be determined.

Typically, the control electronics 124 causes the transducers (e.g., 112, 114) to fire and receives output signals from the transducers. The control electronics 124 may also compute the mean flow velocity for each chord, compute the mean flow velocity for the meter, compute the volumetric flow rate through the meter, compute speed of sound through the fluid, perform meter diagnostics, etc. The volumetric flow rate and other measured and computed values, such as flow velocity, speed of sound, etc. may be output to the condition monitor 128. As noted above, the condition monitor 128 may be included in the control electronics 124 in some embodiments.

For a given chord, the chordal flow velocity v is given by:

$$v = \frac{L^2}{2X} \cdot \frac{T_{up} - T_{dn}}{T_{up} T_{dn}}, \quad (1)$$

and the chordal speed of sound c is given by:

$$c = \frac{L}{2} \cdot \frac{T_{up} + T_{dn}}{T_{up} T_{dn}}, \quad (2)$$

where:
L is the path length (i.e., face-to-face separation between upstream and downstream transducers),
X is the component of L within the meter bore in the direction of the flow, and
$T_{up}$ and $T_{dn}$ are the upstream and downstream transit times of sound energy through the fluid.

The average flow velocity through the meter 101 is given by:

$$v_{avg} = \sum_i w_i v_i \quad (3)$$

where:
$w_i$ is a chordal weighting factor,
$v_i$ is the measured chordal flow velocity, and
the summation i is over all chords.

Returning now to FIG. 1, the sensors 134-138 measure various attributes or parameters of the fluid, and may provide the measurements to the condition monitor 128 via signal conduction media 142 (e.g., wiring). The sensor 134 is a gas composition sensor, such as a gas chromatograph, that provides information indicative of the amount of each constituent of the gas flowing through the system 100. The sensor 136 is a pressure sensor that provides signals indicative of the pressure of the fluid flowing in the system 100. The sensor 138 is a temperature sensor (e.g., a resistance temperature detector) that provides signals indicative of the temperature of the fluid flowing through the system 100. The temperature sensor 138 extends into the interior passage 140 of the pipe 132, and measures the temperature of the fluid flowing through the system 100 at the terminus of sensor 138. Thus, the temperature sensor 138 is positioned to measure the temperature of the fluid at a specific elevation.

From the fluid composition, pressure, and temperature information provided by sensors 134, 136, and 138 respectively, the speed of sound through the fluid stream can be computed using predetermined theoretical or experimental values. For example, the condition monitor 128 may compute speed of sound in the fluid as specified in American Gas Association Report No. 10, "Speed of Sound in Natural Gas and Other Related Hydrocarbons" (AGA 10). Some embodiments of the condition monitor 128 may use this computed speed of sound to verify the speed of sound values measured for each chord of the meter 101.

Similarly, based on the speed of sound measurements provided by the ultrasonic flow meter 101 and the measurements provided by the sensors 134, 136, the condition monitor 128 can compute the temperature, pressure, and/or composition of the fluid flowing through the ultrasonic metering system 100. The condition monitor 128 may compute temperature, pressure, and/or composition using an iterative reverse of the speed of sound computation specified by AGA 10 based on the measured speed of sound provided by the ultrasonic meter 101 and measurements provided by the sensors 134-136.

Figure 3:
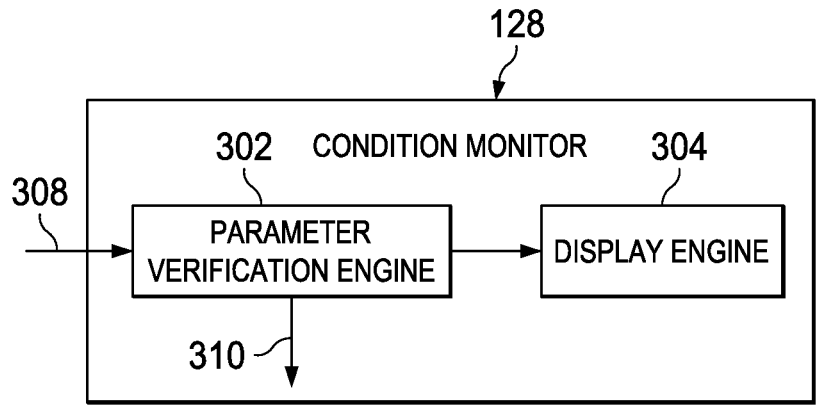
FIG. 3 shows a block diagram of a condition monitoring system in accordance with various embodiments.

FIG. 3 shows a block diagram of the condition monitor 128 in accordance with various embodiments. The condition monitor 128 includes a parameter verification engine 302, and a display engine 304. The parameter verification engine 302 acquires various operational parameters 308 from the ultrasonic meter 101, the sensors 134-138, etc. and processes the parameters to identify changes in operation of the metering system 100 that may be indicative of potential flow measurement inaccuracy or other deviations from expected operation. Embodiments of the parameter verification engine 302 may acquire and process parameters 308, where the parameters 308 include gains applied to ultrasonic transducers, flow profile factor, flow symmetry, crossflow, flow swirl, chordal signal-to-noise ratios, etc.

The parameter verification engine 302 may compute a reference value with respect to each parameter processed. Embodiments of the parameter verification engine 302 may compute the reference value based on a nominal or expected value of the parameter with respect to a reference parameter. The reference parameter may be, for example, velocity or Reynolds number of the fluid flowing through the ultrasonic meter 101 at the time the value of the parameter is acquired. The parameter verification engine 302 may also compute thresholds relative to the reference value. The thresholds may define a range within which values of the parameter being processed are considered to indicate that the flow metering system 100 is operating properly. Conversely, values of the parameter falling outside the range defined by the thresholds may indicate that the flow metering system 100 is not operating properly.

The display engine 304 generates displays for presentation of information provided by the parameter verification engine 302 to a user. For example, the display engine 304 may generate a display of values of a selected operational parameter of the ultrasonic meter 101 relative to corresponding reference values and thresholds. The display engine 304 may present the display via a monitor as is known in the art (e.g., a flat panel monitor), a printer, or other display device.

Figure 4:
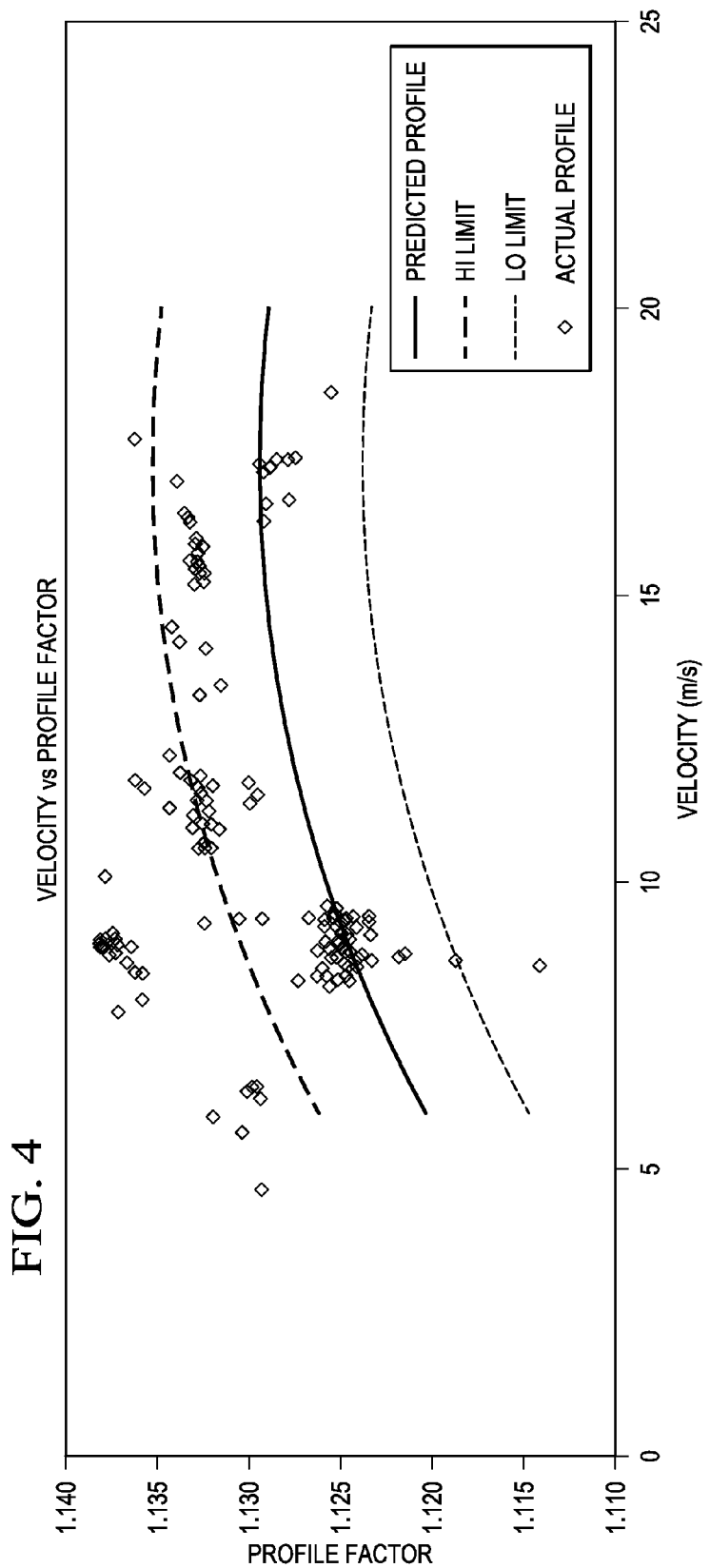
FIG. 4 shows an illustrative plot of a profile factor for an ultrasonic flow meter versus velocity in accordance with various embodiments.

FIG. 4 shows illustrative parameter values processed by the parameter verification engine 302. More specifically, FIG. 4 shows values of the profile factor of the fluid stream relative to velocity of the fluid stream. Profile factor is a parameter comparing the flow near the center of the central passage 104 to the flow near the inner wall of the meter 101. FIG. 4 also shows the reference value and thresholds for profile factor computed by the parameter verification engine 302. The reference value and thresholds are also relative to flow velocity. In FIG. 4, numerous values of flow profile fall outside of the thresholds (e.g., just below 10 m/s of velocity), but it is unclear whether such values occurred randomly or in some relation to one another. Consequently, based on the information provided by the parameter verification engine 302 in FIG. 4, presence of a deviation from expected operation that requires correction cannot be ascertained.

The parameter verification engine 302 provides further processing of the values of a parameter of operation of the ultrasonic meter 101 that enables identification of deviations from expected operation. Embodiments of the parameter verification engine 302 compute the difference of each value of the parameter from the corresponding reference value. In some embodiments of the parameter verification engine 302, the difference may be computed as a percentage difference from the reference value. The parameter verification engine 302 arranges the difference values in the order of parameter value acquisition (i.e., in time sequence).

Figure 5:
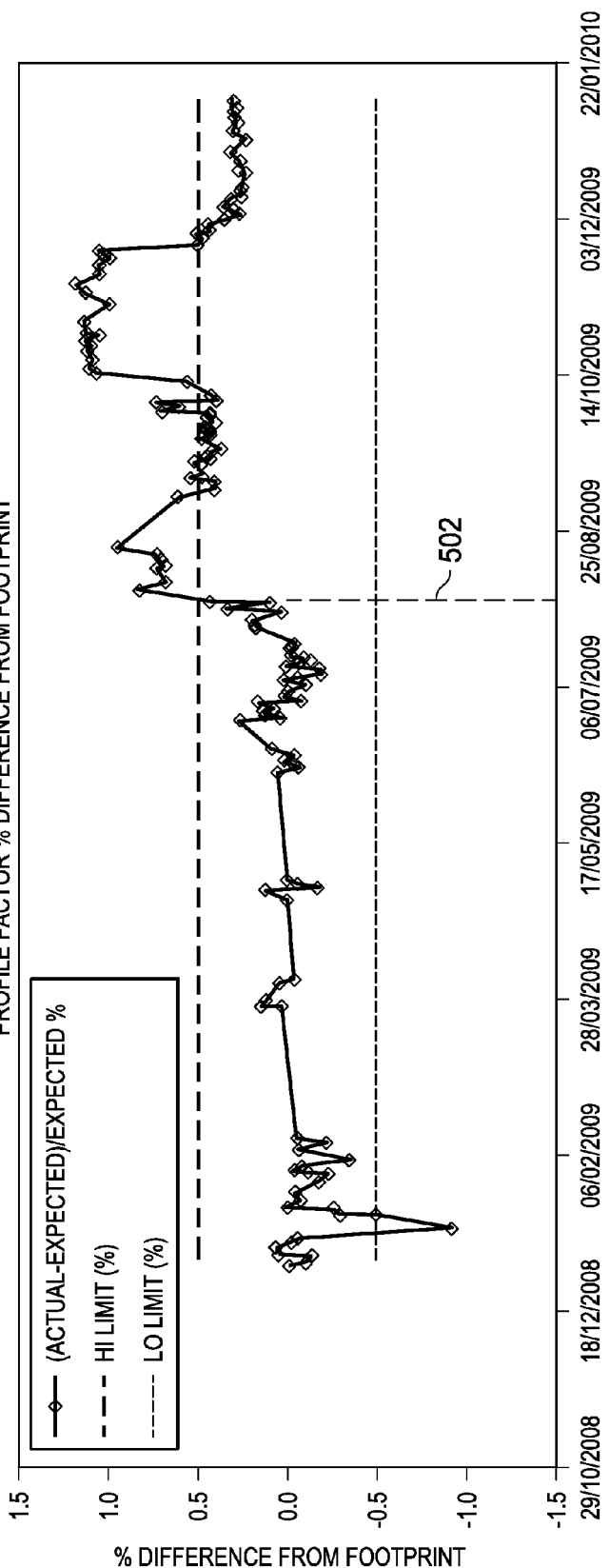
FIG. 5 shows an illustrative plot of deviation versus time for profile factor in accordance with various embodiments.

FIG. 5 shows illustrative difference values versus time for the profile factor values shown in FIG. 4 computed by the parameter verification engine 302 in accordance with various embodiments. The parameter verification engine 302 computes thresholds for the difference values. The thresholds are shown in FIG. 4, and the reference value is effectively at zero. Based on the difference values of FIG. 5, the parameter verification engine 302, and/or a user viewing a display of the difference values can determine that the flow profile values outside the thresholds, as shown in FIG. 4-5, are not randomly occurring, but rather are the result of a change in operation of the ultrasonic flow metering system 100 and/or a change in site conditions beginning at about time 502.

Based on the difference values, the parameter verification engine 302 may generate an alarm 310 (see FIG. 3) notifying a user or another system of a change in metering system operation or system conditions likely affecting metering accuracy or other operations of the metering system 100. In some embodiments, the parameter verification engine 302 may generate the alarm 310 based on predetermined number of difference values exceeding the threshold in sequence or within a given time interval. Some embodiments of the parameter verification engine 302 may generate the alarm 310 based on a trend in the difference values. For example, if a trend of the difference values indicates progressive deviation of the parameter from the predetermined reference and/or towards the threshold, then the parameter verification engine 302 may generate the alarm 310. The parameter verification engine 302 may identify a trend based, for example, on the slope of a line fit to the time sequential difference values. A minimum slope value indicative of such a trend may be predetermined.

Embodiments of the parameter verification engine 302 and the display engine 304 may include hardware resources or hardware and software resources (i.e., instructions) to perform the functions disclosed herein. For example, some embodiments of the parameter verification engine 302 and the display engine 304 may be implemented as a one or more processors executing instructions retrieved from a computer-readable storage medium. Processors suitable for implementing the engines 302-304 may include general-purpose microprocessors, digital signal processors, microcontrollers, or other devices capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. A non-transitory computer-readable storage medium suitable for storing instructions of the engines 402-408 may include volatile storage such as random access memory, non-volatile storage (e.g., a hard drive, an optical storage device (e.g., CD or DVD), FLASH storage, read-only-memory), or combinations thereof.

Some embodiments of the parameter verification engine 302, the display engine 304, and other engines or portions of the condition monitor 128 disclosed herein may be implemented as hardware circuitry configured to perform the functions disclosed herein. Selection of a hardware or processor/instruction implementation of embodiments is a design choice based on a variety of factors, such as cost, time to implement, and the ability to incorporate changed or additional functionality in the future.

Figure 6:
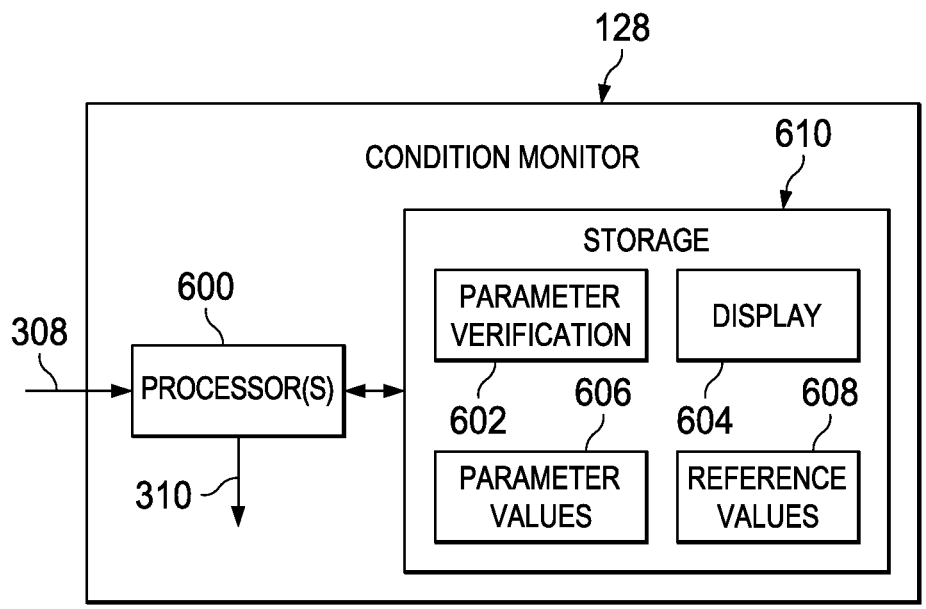
FIG. 6 shows a block diagram of a processor-based embodiment of a condition monitor in accordance with various embodiments.

FIG. 6 shows a block diagram of a processor-based embodiment of the condition monitor 128. The embodiment of the condition monitor 128 shown in FIG. 7 includes a processor 600 and storage 610 coupled to the processor 600. The processor 600 is an instruction execution device as described above. The storage 610 is a computer-readable medium as described above. The processor 600 retrieves and executes instructions stored in the storage 610, reads data from the storage 610, writes data to the storage 610, and communicates with other systems and devices. The storage 610 includes a parameter verification module 602, and a display module 604 which respectively include instructions for implementing the parameter verification engine 302 and the display engine 304. The storage 610 may also include processed and/or unprocessed parameter values 606 (e.g., profile factor values and/or profile factor difference values), reference values 608 that correspond to the parameters processed, threshold values, etc. The processor-based condition monitor 128 shown in FIG. 6 may include various other components, such as network adapters, video interfaces, peripheral interfaces, etc. that have been omitted from FIG. 6 in the interest of clarity.

Figure 7:
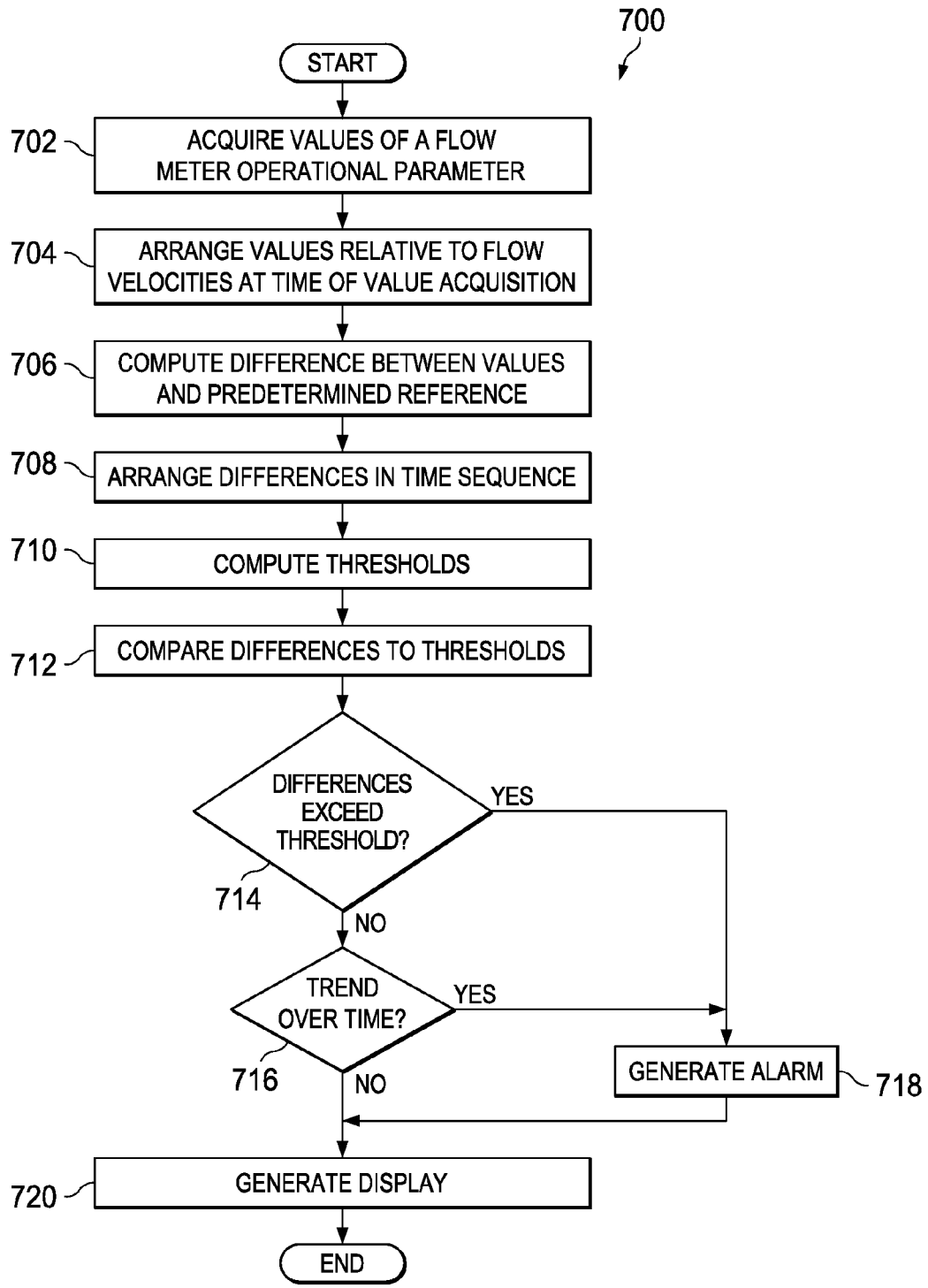
FIG. 7 shows a flow diagram for a method for monitoring the condition of an ultrasonic flow metering system in accordance with various embodiments.

FIG. 7 shows a flow diagram for a method 700 for monitoring the condition of an ultrasonic flow metering system 100 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 700, as well as other operations described herein, can be implemented as instructions stored in computer readable medium 610 and executed by the processor 600.

In block 702, fluid is flowing through the central passage 104 of the ultrasonic flow meter 101, and the flow metering system 100 is measuring the volume of fluid flowing through the passage 104. The condition monitor 128 is acquiring values of an operational parameter of the ultrasonic flow meter 101 and/or associated instrumentation. In practice, the condition monitor 128 may acquire a plurality of values for each of a plurality of operational parameters of the flow meter 101 and/or associated instrumentation. Parameters for which values are acquired may include gains applied to ultrasonic transducer output, flow profile factor, flow symmetry, crossflow, flow swirl, chordal signal-to-noise ratios, flow turbulence, measured speed of sound, measured temperature, measured gas composition, measured pressure, etc.

In block 704, the condition monitor 128 processes the values of the parameter. The processing may include arranging the values relative to a reference parameter. The reference parameter may be, for example, velocity or Reynolds number of fluid flowing through the passage 104 at the time each value is acquired.

In block 706, the condition monitor 128 computes the difference between each value of the parameter and the corresponding reference value. In some embodiments, the difference is computed as a percentage of the reference value. The condition monitor arranges the difference values in parameter value acquisition time sequence in block 708.

In block 710, the condition monitor 128 computes thresholds. The thresholds indicate a range of acceptable values of the parameter at a respective velocity or Reynolds number. The thresholds may be determined based on a predetermined value deemed nominal (as expected) at the velocity or Reynolds number corresponding to each value of the parameter. The condition monitor may compute thresholds for comparison to the value of the parameter, and different thresholds for comparison to the differences.

In block 712, the condition monitor 128 compares the parameter values and/or the differences to the corresponding thresholds. If a predetermined number of difference values exceed the thresholds, in block 714, then the condition monitor 128 may generate an alarm in block 718. In some embodiments, the predetermined number of difference values are sequential in time or occur within a predetermined time interval.

In block 716, the condition monitor 128 identifies trends in the difference values over time. If a trend indicating progressive deviation of the parameter from the predetermined reference and/or towards the threshold is identified, then the condition monitor 128 generates an alarm in block 718.

In block 718, the condition monitor 128 generates a display showing the difference values arranged in time sequence, and the corresponding threshold values. The condition monitor 128 may also generate a display showing the values of the parameter relative to the reference parameter, the reference value, and thresholds corresponding to each value.

The above discussion is meant to be illustrative of the principles and various exemplary embodiments of the present invention. Numerous variations and modifications will become apparent to those skilled in the art once the above disclosure is fully appreciated. It is intended that the following claims be interpreted to embrace all such variations and modifications.

What is claimed is:

1. An ultrasonic flow metering system, comprising:
   a passage for fluid flow;
   an ultrasonic flow meter configured to measure transit time of an ultrasonic signal through the fluid flowing in the passage; and
   a condition monitor coupled to the ultrasonic flow meter and configured to:
   monitor a parameter of operation of the ultrasonic meter;
   acquire a plurality of values of the parameter over time;
   compute, for each of the acquired values, a difference between the acquired value and a predetermined reference; and
   arrange the differences in time sequence.

2. The system of claim 1, wherein the condition monitor is configured to compute the difference as percentage difference of a given one of the acquired values from the predetermined reference.

3. The system of claim 1, wherein the parameter is selected from a group comprising ultrasonic transducer gain, flow profile factor, flow symmetry, crossflow, flow swirl, and chordal signal to noise ratio.

4. The system of claim 1, wherein the condition monitor is configured to generate an alarm based on the difference exceeding a predetermined reference threshold over a predetermined number of successive acquired values.

5. The system of claim 1, wherein the condition monitor is configured to generate an alarm based on a trend of the difference indicating progressive deviation of the parameter from the predetermined reference.

6. The system of claim 1, wherein the condition monitor is configured to compute the predetermined reference based on expected values of the parameter with respect to one of Reynolds number and velocity of the fluid flowing in the passage.

7. The system of claim 1, wherein the condition monitor is configured to generate a display showing:
   values of the difference, relative to the predetermined reference, arranged in time sequence; and
   threshold values relative to the predetermined reference.

8. A method for monitoring operation of an ultrasonic flow meter, comprising:
   acquiring, by a monitoring system, a plurality of values of a parameter of operation of the flow meter during operation of the flow meter;
   computing, by the monitoring system, for each of the acquired values, a difference between the acquired value and a predetermined reference; and
   arranging the differences in time sequence.

9. The method of claim 8, further comprising selecting the parameter from a group consisting of ultrasonic transducer gain, flow profile factor, flow symmetry, crossflow, flow swirl, and chordal signal to noise ratio.

10. The method of claim 8, further comprising computing the difference as percentage difference of one of the acquired values from the predetermined reference.

11. The method of claim 8, further comprising generating an alarm based on the difference exceeding a predetermined reference threshold over a predetermined number of the acquired values that are successive in time.

12. The method of claim 8, further comprising generating an alarm based on a trend of the difference over time indicating progressive deviation of the parameter from the predetermined reference.

13. The method of claim 8, further comprising computing the predetermined reference based on expected values of the parameter with respect to one of Reynolds number and velocity of the fluid flowing in the passage.

14. The method of claim 8, further comprising generating, by the monitoring system, a display showing:
   the predetermined reference;
   threshold values relative to the predetermined reference; and
   values of the difference, relative to the predetermined reference, arranged in time sequence.

15. A condition monitoring system for monitoring operation of an ultrasonic flow meter, comprising:

a parameter verification engine configured to:
- acquire a plurality of values of a parameter of operation of the flow meter during operation of the flow meter;
- compute, for each of the acquired values, a difference between the acquired value and a predetermined reference; and
- arrange the differences in time sequence.

16. The system of claim 15, wherein the parameter is selected from a group consisting of ultrasonic transducer gain, flow profile factor, flow symmetry, crossflow, flow swirl, and chordal signal to noise ratio.

17. The system of claim 15, wherein the parameter verification engine is configured to generate an alarm based on at least one of:
- the difference exceeding a predetermined reference threshold over a predetermined number of the acquired values that are successive in time; and
- the differences exceeding a predetermined reference threshold at least a predetermined number of times within a predetermined time interval.

18. The system of claim 15, wherein the parameter verification engine is configured to generate an alarm based on a trend of the difference indicating progressive deviation of the parameter from the predetermined reference.

19. The system of claim 15, wherein the parameter verification engine is configured to compute the predetermined reference based on expected values of the parameter with respect to one of Reynolds number and velocity of the fluid flowing in the passage.

20. The system of claim 15, further comprising a display engine configured to generate a display showing:
- the predetermined reference;
- threshold values relative to the predetermined reference; and
- values of the difference, relative to the predetermined reference, arranged in time sequence.

* * * * *